Patented July 20, 1954

2,684,362

UNITED STATES PATENT OFFICE 2,684,362

METHOD FOR THE PRODUCTION OF SODIUM PENICILLIN

Jacques L. Wachtel, Lawrenceburg, Ind., Donald R. Croley, Cincinnati, Ohio, and Justin J. Murtaugh, Guilford, Ind., assignors to Schenley Industries, Inc., a corporation of Delaware No Drawing. Application October 23, 1948, Serial No. 56,253

1 Claim. (Cl. 260—239.1)

This invention relates to a new and useful method for the preparation of penicillin, and more particularly to a method for the preparation of the pure sodium salts of penicillin from organic base salts of penicillin.

It is an object of this invention to produce colorless, pure, crystalline sodium salts of penicillin from impure penicillin-containing preparations. It is a further object of the invention to obtain sodium salts of penicillin having a higher benzyl penicillin (penicillin G) content than the impure penicillin-containing preparations.

Heretofore, penicillin has generally been separated from fermentation broths and aqueous solutions by adsorption onto and elution from activated carbon and/or by solvent extraction processes, using solvents such as chloroform, ether, amyl acetate, butyl acetate and the like, under acid conditions. Solutions of the desired alkali or alkaline-earth salts of penicillin where formed from these solvent solutions by contacting them with aqueous solutions or suspensions of alkali or alkaline-earth hydroxides, carbonates, or bicarbonates; the resulting aqueous phase could be separated and dried to yield solids consisting of non-crystalline penicillin salts and impurities. Usually such dried preparations were yellow or orange in color, and had a potency of 500 to 1000 units per milligram, which usually indicated the presence of 40% to 70% impurities, since pure sodium benzyl penicillin (penicillin G) has a potency of 1667 units per milligram. The desirability of producing penicillin preparations of greater purity and less color has been generally recognized, but processing methods heretofore employed have not been suitable to accomplish this objective. In contrast to the prior art, we have found that pure sodium salts of penicillin can be produced in good yield by reacting organic base salts of penicillin with selected sodium salts under certain conditions, as hereinafter described.

The formation of organic base salts of penicillin is known. Thus, for example, the triethylammonium salt, the N-ethyl piperidine salt, or the cyclohexylamine salt have been formed by reacting ether or amyl acetate solutions of penicillin with triethylamine, N-ethyl piperidine, or cyclohexylamine, respectively. In contrast to most of the non-penicillin substances, these organic base salts of penicillin are sparingly soluble in their reaction mixtures and therefore afford a means for the partial separation of penicillin from most of the impurities present. However, the separation from impurities is not complete, and the organic base salts are usually yellow, due to impurities. Furthermore, these organic base salts are not acceptable forms for the therapeutic administration of penicillin, and heretofore it has not been known to convert, other than by solvent extraction methods, such organic base salts to the sodium salts of penicillin which are acceptable therapeutic forms.

It has been found according to this invention, that organic base salts of penicillin can, under certain conditions, be reacted directly with sodium salts of organic acids to yield sodium salts of penicillin of an extraordinary high degree of purity. The process of this invention involves a so-called double decomposition reaction in an organic solvent solution, which reaction may be represented by the following equation:

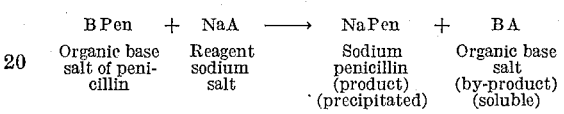

| BPen | + | NaA | ⟶ | NaPen | + | BA |
|---|---|---|---|---|---|---|
| Organic base salt of penicillin | | Reagent sodium salt | | Sodium penicillin (product) (precipitated) | | Organic base salt (by-product) (soluble) |

The reactants are dissolved in organic solvents which are selected for their ability to dissolve their respective solutes and, upon intermixing in the reacttion mass, to form a single phase liquid mixture in which the desired product of the reaction, the sodium salt of penicillin, is substantially insoluble, and in which the other components of the reaction system remain in solution.

Organic base salts of penicillin, such as the triethylammonium salt, the N-ethyl piperidine salt, the cyclohexylamine salt, the N-ethyl morpholine salt, the N-methylmorpholine salt, the N-ethyl-alpha-pipecoline salt, the N-ethyl-hexahydro-2,6-lutidine salt, the benzylamine salt, or the di-isopropylamine salt, exemplify organic base salts which may be used as a starting material for our process. The invention is not limited to the use of these organic base salts.

Reagent sodium salts or compositions which may be used in this invention are, for example: sodium thiocyanate, sodium chlorate, sodium perchlorate, the various sodium phenolates, sodium iodide, sodium ethyl isonitrosocyanoacetate and its homologues, sodium dimethyl-dithiocarbamate and the various sodium dialkyldithiocarbamates. The invention is not limited to the use of these salts.

As some examples of the sodium phenolates, also designated as sodium phenates and sodium phenoxides, reference is made to the following: sodium phenoxide, o-methyl sodium phenoxide, sodium cresylate, sodium p-tert-amyl phenoxide, and the sodium salt of o-hydroxy acetophenone.

As some examples of the sodium dialkyldithiocarbamates, reference is made to the following: sodium dimethyldithiocarbamate, sodium diethyldithiocarbamate, and sodium dibutyldithiocarbamate.

The following are examples of suitable solvents for the organic base salts of penicillin in this process, without limiting the invention thereto: (a) chlorinated organic liquids, such as methylene dichloride, chloroform, sym-tetrachloroethane, and benzal chloride; (b) ketones, such as acetone, methylethylketone, diethylketone, and methylpropylketone; and (c) lower monohydroxy aliphatic alcohols, having 1–5 carbon atoms, such as methanol, ethanol, propanol, isopropanol, n-butanol, sec-butyl alcohol, and the several amyl alcohols. Chlorinated liquids having two substituent chlorine atoms and at least one substituent hydrogen atom on the same carbon atom are especially suited for serving as solvents for the organic base salts of penicillin and as the principal liquid constituent of the reaction mass. This desirable structure is represented by the configuration

where Z represents hydrogen, chlorine, or another carbon atom or an organic radical which may or may not contain additional chlorine atoms. This action is attributed to hydrogen-bonding between the solvent and the organic base salt of penicillin, but the method of the present invention is not in any way limited or restricted by this explanation.

As examples of suitable solvents for the reagent sodium salts in the method of the invention, the following are cited, without limiting the invention thereto: (a) lower aliphatic alcohols, preferably having 1–5 carbon atoms, such as ethanol, ethylene glycol, allyl alcohol, n-propanol, isopropanol, n-butanol, isobutyl alcohol, the amyl alcohols, (b) ketones, such as acetone, methyl ethyl ketone, diethyl ketone, methyl isobutyl ketone, and (c) nitriles, such as acetonitrile, propionitrile, and butyronitrile. These solvents may be used without the addition of water, although sometimes it is desirable to add a small quantity of water, say up to 10% by volume, in order to increase the solubility of the reagent sodium salt in the organic liquid. Also, it has been found that the addition of such a small quantity of water to the organic liquid usually helps to retain colored impurities in the mother liquor of the reaction mass, resulting in a whiter precipitated sodium penicillin salt.

The above-named classes of solvents meet the specified requirements for the solvents to be used in the method of this invention.

The reaction above described may be conducted over a wide temperature range, say between −10° C. and +40° C. However, there are practical advantages in working at approximately room temperatures, say from 15° C. to 25° C., because at these temperatures the organic base salt and the reagent sodium salt are soluble to a convenient extent in their respective solvents, and the end-products, namely, the sodium penicillin, is not excessively soluble in the reaction mixture.

The precipitation reaction upon which this method is based operates over a wide range of concentrations of organic base salts of penicillin and reagent sodium salts in their respective solvents. However, it is usually preferred to use a substantially saturated solution of organic base salt in the selected solvent, so as to minimize the loss of product due to its solubilty. Concentrations of from 200 to 400 grams of organic base salts of penicillin per liter of chlorinated solvent have been found especially desirable in this method.

The reagent sodium salt solution may also be employed over a fairly wide range of concentrations. Usually it is preferred to use a substantially saturated solution of the reagent sodium salt in the selected solvent, so as to keep the volume of the reagent solution low and so as to minimize loss of the reaction product due to solubility in the liquids employed. Either anhydrous solvents or solvents containing up to 10% of water by volume may be used in this process. Reagent sodium salt solutions of concentrations varying from 10 to 300 grams per liter of solvent give the desired results in this process. Since some of the sodium salts which are used as reagent salts possess limited solubilities in some of the solvents named, it is often, but not always, advantageous to increase this solubility by adding a small amount of water to the solvent employed. Very often the water of crystallization in the reagent sodium salt is sufficient to bring the solubilities within workable limits. The amount of water present must be limited, as will be apparent to those skilled in the art, because too much water in the reaction mixture will interfere with the precipitation of the product sodium salt. It is necessary to adjust the water content so as to secure the best over-all results in the process from the standpoints of yield, color, and benzyl penicillin content of the product sodium salt.

The organic base salt of penicillin which is used as the starting material for the process need not have any stipulated degree of purity. All preparations which have been tested have been found suitable for the reactions of this method.

Substantially stoichiometric proportions of reactants are used in the described reaction, although sometimes it is preferred to use an excess of one of the reagents, in accordance with usual practice in conducting reactions in organic chemistry.

When the specified reagent sodium salts are reacted with organic base salts of penicillin under the described conditions, precipitation of sodium penicillin occurs. The precipitated sodium penicillin may be separated from the reaction mass by filtration, centrifugation, or other suitable means.

When the crystals of sodium penicillin are separated from the reaction mass, it is usually desirable to wash the crystals so as to remove adhering impurities. The solvent mixture employed in the reaction, the reagent solvent, or acetone, used in small quantities, are suitable washing liquids. It is usually preferred to wash the crystals first with the reagent solvent in order to remove excess reagent salt which might be present. It is then usually preferred to wash with acetone, to expedite drying of the end-product.

In addition to providing a means of obtaining high yields of pure, therapeutically acceptable penicillin from impure preparations, the method of this invention results in a preferential precipitation of the sodium salts of benzyl penicillin from the reaction mixture, which is an important advantage because benzyl penicillin is now the commercially desired form of penicillin. The concentration of benzyl penicillin which may be obtained in the sodium penicillin product is a function of the benzyl penicillin content of the organic base salt used as starting material for the process. Thus, by this process, an organic base salt of penicillin consisting of about 50% benzyl penicillin yields sodium salts of penicillin which contain about 80% of benzyl penicillin, whereas organic base salts which contain from 75 to 85% benzyl penicillin yield, by the method of this invention, sodium salts of penicillin containing in excess of 90–95% benzyl penicillin, as measured by accepted methods of analysis for benzyl penicillin, such as the ultra-violet spectrophotometer method, or the N-ethyl piperidine precipitation method.

As typical of the manner in which this invention may be practiced, the following examples are given, although these examples are to be considered in no way restrictive.

*Example 1*

5 gm. of yellow triethylammonium penicillin containing 90% benzyl penicillin (as determined by the N-ethyl piperidine method) were dissolved in 13 ml. of U. S. P. chloroform. To this solution was then added, with stirring, a solution of 5 gm. of sodium iodide in 40 ml. of acetonitrile. Crystals of sodium penicillin separated within a few seconds, and after cooling the mixture for 10 minutes in an ice bath, the precipitate was filtered off by suction and washed with a little acetonitrile, followed by washing with a little acetone. The product weighed 4.032 gm., was white in color, assayed 1660 units/mg. (penicillinase assay) and contained 93% benzyl penicillin (N-ethyl piperidine method). The recovery of benzyl penicillin was quantitative; the recovery of total penicillins amounted to 98.4%.

*Example 2*

5.14 gm. of yellow N-ethyl piperidine penicillin salt (90% benzyl penicillin as determined by the N-ethyl piperidine precipitation method) were dissolved in 20 ml. of U. S. P. chloroform. A solution of 1.5 gm. of sodium thiocyanate in 50 ml. of acetone was then added with stirring. Sodium penicillin crystals started to precipitate within a few seconds. The mixture was cooled in an ice bath for a half hour and the precipitate was then filtered off and washed with a little acetone. The very pale yellow product weighed 3.824 gm., contained 95% benzyl penicillin (N-ethyl piperidine method) and assayed 1658 units/mg. (penicillinase assay). The recovery of benzyl penicillin amounted to 98.5%; the recovery of all penicillins was 93.5%.

*Example 3*

20 gm. of yellow triethylammonium pencillin (98% benzyl penicillin as determined by the N-ethyl piperidine method) were dissolved in 60 ml. of tetrachloroethane. To this solution was added, with stirring, a solution of 15 gm. of sodium phenolate ($C_6H_5ONa \cdot$) in 30 ml. of acetone. Sodium penicillin started to precipitate almost immediately. The mixture was placed in an ice bath for a half hour. The crystals were then filtered off by suction and washed with acetone. The pale yellow dried product weighed 16.624 gm. The recovery of penicillin G and of total penicillins was practically quantitative.

*Example 4*

3 grams of yellow triethylammonium penicillin (containing 83.4% of benzyl penicillin as determined by the ultraviolet spectrophotometric method) were dissolved in 12 ml. of sym-tetrachloroethane and to this solution was added with stirring, a solution of 1.55 gm. of sodium dimethyldithiocarbamate ($(CH_3)_2NCSSNa \cdot 2\frac{1}{2}H_2O$) dissolved in 32 ml. of n-butanol. Crystals of sodium penicillin separated within a minute. The mixture was then cooled in an ice bath for a half hour, and the precipitate was filtered off by suction and washed successively with a little tetrachloroethane, n-butanol and acetone. The dried product (1.92 gm.) was white, assayed 1660 u./mg. (penicillinase method) and contained 98% benzyl penicillin (ultraviolet spectrophotometer method). The recovery of benzyl penicillin amounted to 92%; the recovery of all penicillins was 78%.

Preferred embodiments of this invention have been described, but numerous changes, omissions, additions and variations can be made without departing from its scope.

We claim:

Process for the formation of sodium penicillin which comprises metathetically reacting a tertiary amine salt of penicillin and sodium perchlorate in a polar organic solvent solution.

References Cited in the file of this patent

UNITED STATES PATENTS

| Number | Name | Date |
| --- | --- | --- |
| 2,459,315 | Goldberg et al. | Jan. 18, 1949 |
| 2,463,943 | Behrens | Mar. 8, 1949 |
| 2,493,625 | Goldberg et al. | Jan. 3, 1950 |

FOREIGN PATENTS

| Number | Country | Date |
| --- | --- | --- |
| 607,004 | Great Britain | Aug. 24, 1948 |

OTHER REFERENCES

Abraham et al.: "The British Journal of Expt'l Pathology," vol. 23, June 1942, page 113.

British Report, CMR–Br–234 (PB–79927), December 5, 1947 (received N. Y., April 18, 1946), page 4.